Figure 1:
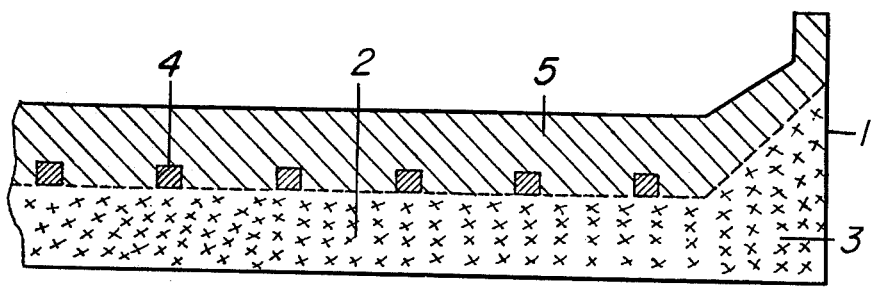

United States Patent [19]

Sala

[11] 4,052,288
[45] Oct. 4, 1977

[54] PROCESS FOR BRASQUING FUSED ELECTROLYSIS CELLS

[75] Inventor: Jean-Marie Sala, La Coruna, Spain

[73] Assignee: Aluminium Pechiney, Lyon, France

[21] Appl. No.: 758,490

[22] Filed: Jan. 11, 1977

[30] Foreign Application Priority Data

Jan. 13, 1976 France .................................. 76.01193

[51] Int. Cl.² .................... C25C 3/08; C25B 11/12; F27D 1/16
[52] U.S. Cl. .................. 204/243 R; 204/244; 204/294; 264/30
[58] Field of Search .............. 204/243 R, 244–247, 204/67, 294; 264/30; 13/35

[56] References Cited

U.S. PATENT DOCUMENTS

| | | | |
|---|---|---|---|
| 3,457,158 | 7/1969 | Bullough | 204/243 |
| 3,471,380 | 10/1969 | Bullough | 204/67 |
| 3,514,520 | 5/1970 | Bacchiega et al. | 204/243 R X |
| 3,723,286 | 3/1973 | Hunt et al. | 204/243 R |
| 3,764,509 | 10/1973 | Etzel et al. | 204/243 R |

*Primary Examiner*—G. L. Kaplan
*Assistant Examiner*—D. R. Valentine
*Attorney, Agent, or Firm*—Dennison, Dennison, Meserole & Pollack

[57] ABSTRACT

A process for brasquing cells for the fused electrolysis of alumina from the recovery of used brasques by treating the ground carbon-containing and refractory products of the base and walls by a known method with filtration of the insoluble constituents, distinguished by the fact that the base and lateral walls are covered by a heat-insulating bed formed by a mixture of carbon, NaF, $CaF_2$, $Al_2O_3$, $Na_2SO_4$ and $CaSO_4$, and by the fact that the cathode resting on the heat-insulating bed and containing the electrically conductive elements is formed from a brasque paste consisting of carbon, NaF, $CaF_2$, $AlF_3$, $Na_2O$ and $Al_2O_3$ associated with a binder which may be pitch.

The qualities of the aluminum obtained from this cell are unchanged in relation to conventional processes.

7 Claims, 2 Drawing Figures

PROCESS FOR BRASQUING FUSED ELECTROLYSIS CELLS

This invention relates to a new process for brasquing cells for the fused electrolysis of alumina with a mixture of carbon, sodium and calcium fluoride, alumina, sodium and calcium sulfates emanating from the treatment of used brasques, these various constituents optionally being impregnated with a binder.

In the context of the invention, "used brasques" are the carbonaceous and refractory products left on the bottom and side walls of cells for the fused electrolysis of alumina when they are shut down on completion of service following removal of the fused bath and the metal.

For some time now, the aluminum industry has been disposing of the debrasquing products of cells for the fused electrolysis of alumina by dumping them on slag heaps or by submerging them in ponds in the absence of any preliminary treatment.

Motivated by the need for valorization, the aluminum industry has attempted to recover the essential constituents which are present in used brasques or which may be extracted therefrom by simple chemical transformation treatments.

For example, in one known process for recovering cryolite from the charcoal bed of electrolysis furnaces, the crushed charcoal is treated with an alkaline solution, the insoluble constituents are filtered off and the cryolite is precipitated by the addition of an alkali bicarbonate or carbonic acid. The carbon-containing fraction removed, filtered, washed and dried, representing approximately 40% of the carbon emanating from the used brasques, is optionally used for the production of new beds.

In another known treatment and recovery process, all the carbon-containing portions of used brasques are crushed, the 1.6 mm – 19 mm fraction obtained is collected and then treated in a rotary furnace with steam under pressure to obtain a thermal granulometric reduction with the appearance of "fines" rich in fluorine-containing products.

This is followed by separation on a 1.6 mm mesh screen. The fraction passing through this screen, consisting of the fine decomposition products rich in highly basic cryolite-containing compounds, is either dumped or used for the production of cryolite-containing products, while the retained fraction, consisting of charcoal, is intended for the productin of new brasque paste.

Despite all its advantages, this process has a significant disadvantage in that the fraction with a grain size of less than 1.6 mm left after grinding, which is extremely rich in sodium and fluorine, is generally not treated and hence contributes towards pollution of the environment.

Accordingly, conventional processes for the valorization of used brasques are characterized by inadequacies in the sense that the problem of pollution has never been completely resolved and the ground products emanating from used brasques necessitate the rejection of the smallest particles or even highly complex treatments which make all the valorization efforts ineffectual and illusory.

It has also been found that only the carbon recovered could be reused for the production of brasque pastes used for assembling the carbon-containing cathode blocks or even the lateral walls of the cells known more commonly as "side-slabs."

From applicant's knowledge of the prior art, its disadvantages and inadequacies, applicant's continuing research has resulted in the finding and perfecting of a complete valorization of used brasques.

An object of the invention is to provide a new process for brasquing cells for the fused electrolysis of alumina from the recovery of used brasques by treating the ground, carbonaceous and refractory products of the base and walls by a known method, distinguished by the fact that: (a) the base and the lateral walls of the cell are covered by a heat-insulating bed consisting of a mixture of carbon, NaF, $CaF_2$, $Al_2O_3$, $Na_2SO_4$ and $CaSO_4$; and (b) the cathode resting on the heat-insulating bed and containing the electrically conductive elements is made from a brasque paste consisting of a mixture of carbon, NaF, $CaF_2$, $Al_2O_3$, $AlF_3$, $Na_2O$ and a binder.

Using a conventional process, the used brasques are first ground to an adequate grain size and are then treated with a strongly alkaline agent which dissolves most of the fluorides of sodium and aluminum. By suitable filtration, the solid fraction which essentially contains a quantity of carbon at least equal to 35% by weight of dry materials and of which the rest is formed by a mixture of sodium fluoride, calcium fluoride, aluminum fluoride, sodium oxide and alumina, is separated from the liquid fraction.

It is this solid fraction which is used for the preparation of the brasque pastes made from the constituents which are recovered during this initial treatment of the used brasques and to which is added a binder generally selected from the petroleum pitches left as residues in the distillation of crude petroleum under reduced pressure or at atmospheric pressure or even the coal tar pitches left as residues in the distillation of tars emanating from the coking of coal and subjected to heat treatment.

According to the invention, the brasque pastes have the following composition, expressed in per cent by weight: from 40 to 80% of carbon, from 0 to 30% of NaF, from 0 to 8% of $CaF_2$, from 0 to 3% of aluminum fluoride, from 0 to 5% of sodium oxide and from 0 to 20of alumina; from 10 to 20% of binder. The liquid fraction collected after the alkaline treatment is in turn treated with calcium ions, preferably in the form of $Ca(OH)_2$ to precipitate and separate the calcium fluorides and to regenerate NaOH. Some of the mother liquors collected after this separation may be neutralized with an acid, such as $H_2SO_4$, the rest being recycled for the treatment of the used brasques. There is thus obtained a crystallized mixture containing sodium fluoride, calcium fluoride, alumina, sulfates of sodium and calcium and a certain quantity of carbon.

It has been found that, with this second crystallized mixture, it is possible to replace that part of the bed of the cell which is normally made of refractory bricks and/or alumina by a heat-insulating bed consisting of said mixture.

In addition, it has been found that the heat-insulating bed according to the invention may be arranged along the lateral walls of the cell so that these walls are protected from the fused bath.

In the process according to the invention, the heat-insulating mixture intended to form the base and lateral walls of the cell contains, expressed in per cent by weight, from 0 to 100% of carbon, from 0 to 10% of NaF, from 0 to 100% of $CaF_2$, from 10 to 25% of Al- $_2O_3$ and from 0 to 30% of $Na_2SO_4$ and $CaSO_4$. The cathode and the feeder bars for the current rest on the heat-insulating bed thus formed.

According to the invention, the cathode may be completely or partly made with brasque paste. In the first variant, the cathode is formed by a thick layer of a brasque paste containing the above-metnioned crystallized elements and carbon, the mixture being rendered pasty by the introduction of a binder. In this case, the feeder bars for the current are embedded in the cathode mass.

In the second variant, the cathode is formed by an assembly of molded carbon blocks rendered integral by the brasque paste. In this case, the current feeder bars are introduced into channels formed for this purpose in the carbon blocks.

Figure 2:
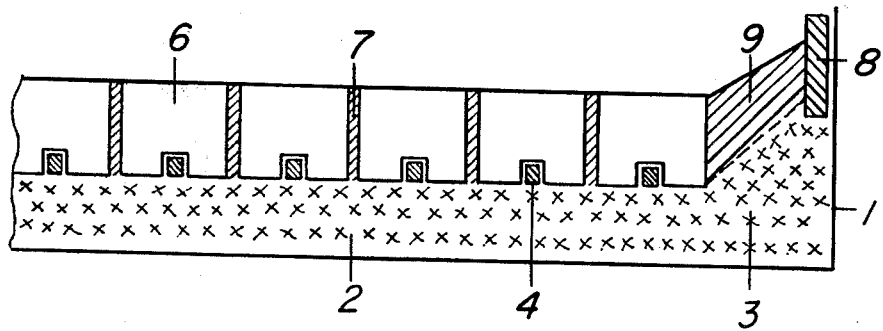

The invention will be better understood from the following description in conjunction with the accompanying drawings, wherein:

FIG. 1 is a vertical section through a cell for the fused electrolysis of alumina; and FIG. 2 is a vertical section through another form of cell.

In FIG. 1, the cell comprises a tank 1 of which the base, made of refractory bricks in accordance with the prior art, is formed by a heat-insulating bed 2 consisting of the crystallized mixture of sodium fluoride, calcium fluoride, alumina, sulfates of sodium and calcium and carbon obtained by a treatment of used brasques. The heat-insulating bed 2 rises at 3 along the lateral walls of the cell 1. Bars 4 for feeding current to the cathode 5 rest on the heat-insulating bed, the cathode being formed by a thick layer of a brasque paste containing the crystallized elements and the carbon emanating from the treatment of used brasques and pitch as binder.

FIG. 2 is a vertical section through a cell for the fused electrolysis of alumina. The tank 1 comprises a base formed by a heat-insulating bed 2 which consists of the crystallized mixture of sodium fluoride and calcium fluoride, alumina, sulfates of sodium and calcium and carbon obtained by a treatment of used brasques and which, for example, extends slightly upwards at 3 along the lateral wall of the tank 1. The cathode in this case is formed by an assembly of molded carbon blocks 6, the brasque paste enabling the cathode blocks 6 to be joined together as at 7. Similarly, the cathode is joined for example to the lateral wall of the cell 1 by way of a plate 8 and at 9 by an inclined surface formed by the optionally molded brasque paste.

EXAMPLE I

A cell for the fused electrolysis of alumina was equipped with the components extracted from used brasques by the process comprising, after grinding, solubilizing, the fluorine-containing and sodium-containing elements, separating the insoluble fractions and then adding lime to the extracted solution to obtain calcium fluoride, one of the principal elements.

After washing, recrystallization and drying, a crystallized carbon-containing mixture with the following composition, in per cent by weight, was obtained: carbon 50% calcium fluoride 25%, alumina 15%; and sodium sulfate plus calcium sulfate 10%.

This mixture was applied to the base of the tank to form a heat-insulating bed extending upwards along the sides thereof.

Cathode blocks of carbon were then placed on the heat-insulating bed and joined together by the brasque paste containing, in per cent by weight: 85% of the solid mixture containing 70% of carbon, 5% of NaF, 6% of $CaF_2$, 3% of $Na_2O$ and 16% of $Al_2O_3$: and 15% of coking coal tar pitch as binder.

The cell had a capacity of 9000 A and had operated without interruption for 6000 hours. At the end of this period, the cell was voluntarily shut down in order to observe the state of its base, walls and cathode. No premature deterioration was found. The quality of the aluminum was unchanged in relation to conventional processes.

I claim:

1. A process for brasquing the base and lateral walls of a cell for the fused electrolysis of alumina from the recovery of used brasques by treating the ground carbon-containing and refractory products of the used base and walls by a known process with filtration of the insoluble constituents, wherein the improvement consists of the steps of (a) covering the base and lateral walls of the cell with a heat-insulating bed consisting of a mixture of carbon, NaF, $CaF_2$, $Al_2O_3$, $Na_2SO_4$ and $CaSO_4$; and (b) providing cathode means on the heat-insulating bed with electrically conductive current feeder elements contained therein, the cathode means being a brasque paste derived from used brasque consisting of a mixture of carbon, NaF, $CaF_2$, $Al_2O_3$, $AlF_3$, $Na_2O$ and a binder.

2. A brasquing process as claimed in claim 1 wherein the heat-insulating mixture contains, in per cent by weight, from 0 to 100% of carbon, from 0 to 10% of NaF, from 0 to 100% of $CaF_2$, from 10 to 25% of $Al_2O_3$, from 0 to 30% of $Na_2SO_4$ and $CaSO_4$.

3. A brasquing process as claimed in claim 1, wherein the brasque paste used for making the cathode contains, in per cent by weight, from 80 to 90% of a solid mixture containing from 40 to 80% of carbon, from 0 to 30% of NaF, from 0 to 8% of $CaF_2$, from 0 to 3% of $AlF_3$, from 0 to 5% of $Na_2O$, from 0 to 20% of $Al_2O_3$, and from 10 to 20% of a binder.

4. A brasquing process as claimed in claim 1, wherein the binder is selected from a member of the group consisting of petroleum pitches and coal tar pitches.

5. A brasquing process as claimed in claim 1 wherein the brasquing for the lateral walls is formed by elements molded from the brasque paste.

6. A process as claimed in claim 1 wherein the cathode is formed by a thick layer of brasque paste in which the current feeder elements are embedded.

7. A brasqueing process as claimd in claim 1 wherein the cathode is formed by precalcined blocks of carbon joined together by the brasque paste.

* * * * *